July 24, 1962 D. M. BRISCOE 3,045,988
FLEXIBLE DRIVE BEATER
Filed Aug. 15, 1960 2 Sheets-Sheet 1

INVENTOR.
DONALD M. BRISCOE
BY
Barnes & Seed
ATTORNEYS

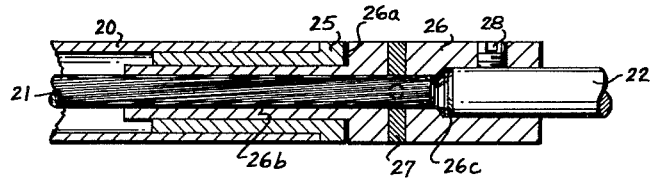
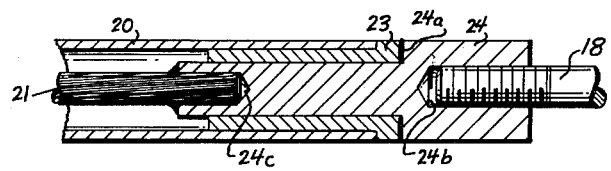
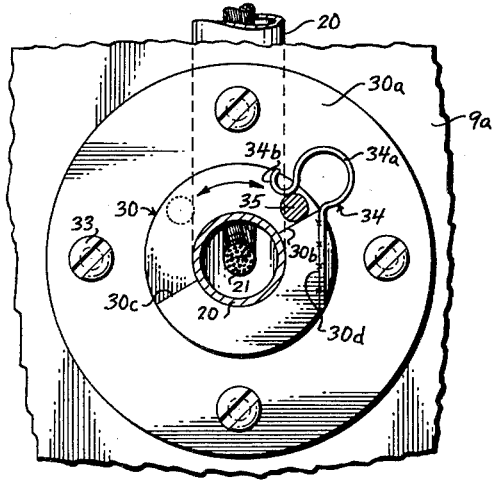
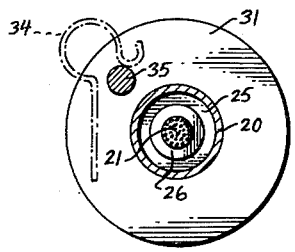

3,045,988
FLEXIBLE DRIVE BEATER
Donald M. Briscoe, Seattle, Wash., assignor to Sweden Freezer Manufacturing Co., Seattle, Wash., a corporation of Washington
Filed Aug. 15, 1960, Ser. No. 49,489
6 Claims. (Cl. 259—106)

The present invention relates to a beater with a flexible drive, and particularly one which can be swung between active and inactive positions.

An important object of the invention is to provide apparatus of simple and economical construction which can be easily mounted on the front of a dispensing freezer and used to mix frozen product with a change of flavoring syrup in a paper cup or other container while the frozen product is being drawn from the freezer.

Another object is to provide a swingable beater with a flexible drive which will always assume a predetermined active position when swung in a given direction, and which will be yieldingly held in such position.

With yet additional objects and advantages in view which, with the foregoing will appear and be understood in the course of the following description and claims, the invention consists in the novel construction and in the adaptation and combination of parts hereinafter described and claimed.

In the accompanying drawings:

FIG. 4 is an enlarged, fragmentary sectional view taken along the line 4—4 of FIG. 3;

Figure 3:
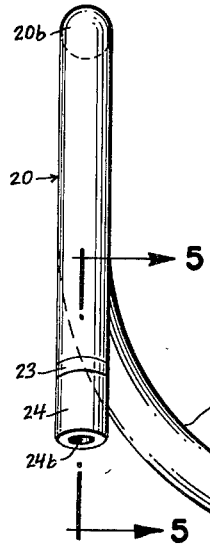
FIG. 3 is a side elevational view to an enlarged scale showing the drive for the beater and the manner of mounting the same in the freezer frame, shown in vertical section.
Figure 3:
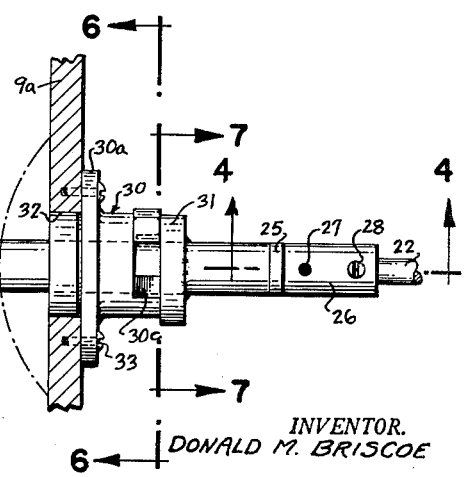

FIG. 5 is an enlarged fragmentary sectional view taken as shown by the line 5—5 of FIG. 3 and with the beater shaft in operative position; and FIGS. 6 and 7 are enlarged transverse sectional views taken as indicated by the lines 6—6 and 7—7, respectively, of FIG. 3.

Referring to the drawings, numeral 9 identifies a dispensing freezing machine for delivering frozen product such as ice cream, frozen custard, slush ice, etc. from a freezing cylinder 10 to a delivery spigot or gate 11 in a removable front cover plate 12. This cover is held by thumb screws 13 to a boss 14 of a thermal insulating material. Discharge from the spigot is controlled by a valve 15, the frozen product being urged toward the spout by the dasher 16 in the freezing cylinder. Spouts 17 may be provided beneath the spigot 11 to selectively supply flavoring syrup to the paper cup or other receptacle into which the frozen product is dispensed.

For mixing the frozen product and flavoring syrup together, or for mixing with milk or other liquid preliminarily provided in the cup for making a frozen drink such as a milkshake, the present invention provides a beater comprising a shaft 18 and beater element 19. The beater shaft obtains its journal support from a tube 20 which projects from the front of the freezer 9 adjacent the boss 14, and is driven by a flexible shaft 21 threaded through the tube 20 and coupled to a motor whose drive shaft is numbered 22.

Directing attention to FIG. 5, it is seen that the coupling between the beater shaft 18 and flexible shaft 21 comprises a bushing 23 and a beater adapter 24. The bushing fits snugly into the free end of the tube 20 and serves as a journal for the adapter which is stepped at 24a to shoulder against the outer end of the bushing and is bored at both ends as indicated by 24b—24c. It will be noted that bore 24b is tapped to make a screw fitting with the threaded end of the beater shaft whereas silver solder is used to secure the outer end of the flexible shaft 21 in the bore 24c.

As shown in FIG. 4 the inner end of the tube 20 is also provided with a bushing, denoted 25, providing a journal for a motor adapter 26. The latter shoulders against the bushing 25 at 26a and is longitudinally through bored and counter-bored at 26b—26c. Between the shoulder 26a and counterbore 26c the motor adapter is formed with radial passages for receiving silver solder 27 to secure the inner end of the flexible shaft 21 in the bore 26b. The counter-bore 26c receives the motor shaft 22 which is held in such position by a set screw 28.

Figure 1:
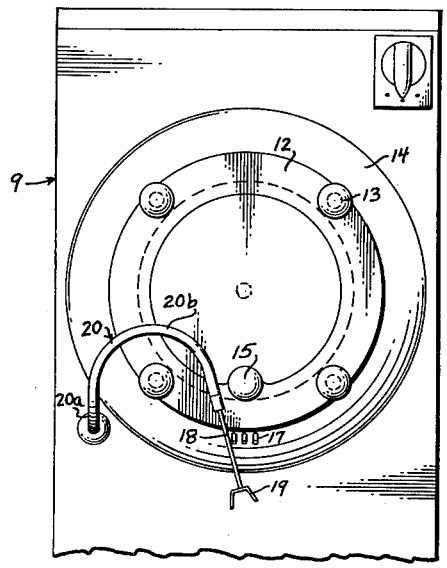
FIG. 1 is a front elevational view illustrating the beater assembly of the present invention mounted in a dispensing freezer, shown fragmentarily.
Figure 2:
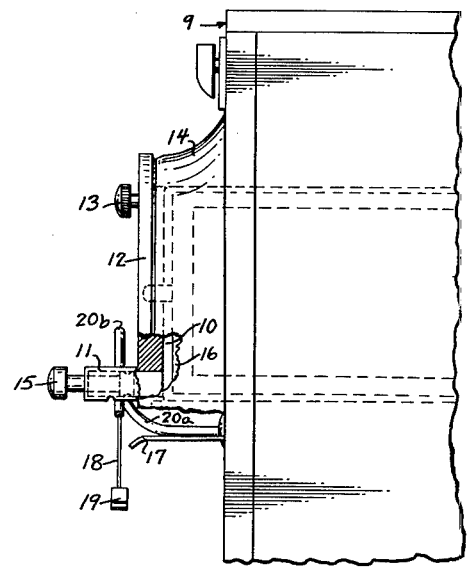
FIG. 2 is a side elevational view of the beater assembly and dispensing freezer with part of the latter broken away and shown in vertical section.

To swingably mount the tube 20 in the frame 9a of the freezer so that it can be moved into and out of operative position, there is provided a sleeve member 30 and a collar 31. The latter is welded onto the tube 20 adjacent its inner end while the sleeve member seats at the front in an opening 32 in the freezer frame and is formed with an intermediate ring flange 30a which bears against the back face of the frame and receives anchor screws 33. At the back the sleeve member 30 is milled to give a semi-circular backcut providing stop shoulders 30b—30c and to give a chord face 30d intersecting the stop shoulder 30b. Welded to this face 30d is a leaf spring 34 bent to form a spring loop 34a terminating opposite the shoulder 30b by a guide loop 34b. A pin projects rigidly from the collar 31 and is gripped between the spring 34 and the stop shoulder 30b as shown in FIG. 6 when the tube 20 is located with the beater in operative position as illustrated in FIG. 1. In this manner the leaf spring 34 yieldingly resists movement of the tube 20, and hence of the beater, out of operative position. However, when it is desired to swing the beater into inactive position as when the freezer cover 12 is to be removed, it is only necessary to dislodge the pin 35 by manually overcoming the pin locking pressure of the spring 30 by pushing sufficiently on the tube 20 or beater shaft 18 in the clockwise direction as viewed from the front of the freezer. Swing in such direction is limited by engagement of the pin 35 with the stop face 30c.

The support tube 20 is shaped to locate the beater element 19 directly beneath the spigot 11 when the pin 35 is locked by the spring 34. To accomplish this result the beater shaft 18 is sloped parallel to the freezer front to avoid the spigot, but this slope is small enough to permit a beverage cup to be lifted up over the shaft while remaining aligned beneath the spigot. Such slope to the beater shaft is provided by giving the tube 20 an upward quarter-turn bend 20a perpendicular to the freezer front and a downward bend 20b parallel to the freezer front and encompassing somewhat less than a half turn.

The device is preferably placed in operation by a foot switch operating the motor for shaft 22 when a paper cup or other receptacle is manually located over the lower end of the beater shaft 18 and beneath the spigot 11 and flowing spouts 17 with the valve 15 pulled open to dispense frozen product into the cup. Prior to or during such frozen product dispensing a charge of selected flavoring may be delivered to the cup through a respective one of the spouts 17 by a suitable pump mechanism (not shown). As before pointed out, during operation of the beater the tube 20 is held in proper position by coaction of the spring 34 and pin 35. When it is desired to use the freezer without mixing the frozen product with other ingredients, or when it is required to remove the cover 12 for cleaning the freezing cylinder 10, the beater and its drive are easily swung to one side by manually overcoming the pressure of the spring 34 by pushing clockwise on the tube 20 or beater shaft 18 to swing the mechanism within the sleeve 30.

The advantages of the invention, it is thought, will have been clearly understood from the foregoing detailed description of the illustrated preferred embodiments. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In combination, a frame, a sleeve anchored on said frame, a tube journaled in said sleeve and projecting therefrom forwardly and bending downwardly, a motor mounted behind said tube, a beater having a depending shaft journal-mounted at the top in the front end of said tube, and a flexible drive shaft in said tube and operatively connected at its back end to said motor and at its front end to said beater shaft.

2. In combination, a frame, a sleeve anchored on said frame, a tube journaled in said sleeve and projecting therefrom forwardly and bending downwardly; front and back adapters journaled for rotation in the front and back ends of said tube, a flexible drive in said tube and anchored at its ends to said adapters, a motor operatively connected to said back adapter, and a beater having a depending shaft connected to said front adapter.

3. In combination, a frame, a sleeve anchored on said frame, a tube journaled on said sleeve and projecting downwardly, a collar anchored on said tube, cooperating stop means on said sleeve and collar for limiting swing of said tube between active and inactive positions, a motor mounted behind said tube, a beater having a depending shaft journal-mounted at the top in the front end of said tube, and a flexible drive shaft in said tube and operatively connected at its back end to said motor and at its front end to said beater shaft.

4. In combination, a dispensing freezer having a frame and a removable front cover plate with a gate for the delivery of frozen product, a motor mounted on said frame behind the front thereof, a forwardly projecting support tube swingably mounted near its back end on the front of said frame for swinging movement between active and inactive positions, a beater having a shaft journal-mounted in the front end of said tube and having a beater element, a flexible drive shaft in said tube and operatively connected at its back end to said motor and at its front end to said beater shaft, said tube being so bent parallel to the front of said frame as to give the beater shaft a downward slope and locate the beater element directly beneath said gate when the tube is in said active position and to locate said beater radially beyond said cover plate when the tube is in said inactive position.

5. In combination, a dispensing freezer having a frame and a removable front cover plate with a gate for the delivery of frozen product, a motor mounted on said frame behind the front thereof, a sleeve extending through said frame in front of said motor and anchored to the frame, a forwardly projecting support tube journaled near its back end in said sleeve for swinging movement, a collar anchored on said tube, cooperating stop means on said sleeve and collar for limiting swing of said tube between active and inactive positions, a beater having a shaft journal-mounted in the front end of said tube and having a beater element, a flexible drive shaft in said tube and operatively connected at its back end to said motor and at its front end to said beater shaft, said tube being so bent parallel to the front of said frame as to give the beater shaft a downward slope and locate the beater element directly beneath said gate when the tube is in said active position and to locate said beater radially beyond said cover plate when the tube is in said inactive position.

6. The structure of claim 5 in which spring means are operatively associated with said stop means for yieldingly holding said tube in said active position.

References Cited in the file of this patent
UNITED STATES PATENTS
1,618,650    Gilchrist             Feb. 22, 1927